United States Patent [19]
Cooper et al.

[11] Patent Number: 5,903,308
[45] Date of Patent: May 11, 1999

[54] PHASE COMPENSATION FOR VIDEO CAMERAS

[75] Inventors: Alan Neal Cooper; David William Bauerle, both of Coppell; Matthew John Fritz, Dallas, all of Tex.

[73] Assignee: Ultrak, Inc., Lewisville, Tex.

[21] Appl. No.: 08/702,915

[22] Filed: Aug. 26, 1996

[51] Int. Cl.$^6$ .................................................. H04N 5/232
[52] U.S. Cl. ........................................... 348/211; 348/143
[58] Field of Search ...................... 348/207, 211, 348/212, 213, 311, 312, 295, 143, 13, 14, 15, 17, 500, 521, 518; 370/503, 508, 509, 516, 517; H04N 5/232

[56] References Cited

U.S. PATENT DOCUMENTS

| | | |
|---|---|---|
| 3,580,998 | 5/1971 | Hammond et al. . |
| 3,811,008 | 5/1974 | Lee . |
| 3,900,705 | 8/1975 | Richter . |
| 4,037,250 | 7/1977 | McGahan et al. . |
| 4,051,524 | 9/1977 | Baxter . |
| 4,091,422 | 5/1978 | Amster . |
| 4,218,709 | 8/1980 | Baxter et al. . |
| 4,298,889 | 11/1981 | Burianek et al. . |
| 4,337,481 | 6/1982 | Mick et al. . |
| 4,511,886 | 4/1985 | Rodriquez . |
| 4,517,593 | 5/1985 | Keller et al. . |
| 4,577,344 | 3/1986 | Warren et al. . |
| 4,603,352 | 7/1986 | Kaneta et al. . |
| 4,700,230 | 10/1987 | Pshtissky . |
| 4,814,869 | 3/1989 | Oliver, Jr. . |
| 4,920,371 | 4/1990 | Kaneko . |
| 4,943,854 | 7/1990 | Shiota et al. . |
| 4,943,864 | 7/1990 | Elberbaum . |
| 4,945,417 | 7/1990 | Elberbaum . |
| 4,949,181 | 8/1990 | Elberbaum . |
| 4,954,886 | 9/1990 | Elberbaum . |
| 4,977,449 | 12/1990 | Morgan . |
| 4,989,085 | 1/1991 | Elberbaum . |
| 5,001,473 | 3/1991 | Ritter et al. . |
| 5,226,066 | 7/1993 | Barr . |
| 5,237,408 | 8/1993 | Blum et al. . |
| 5,239,376 | 8/1993 | Dittmann et al. . |
| 5,243,425 | 9/1993 | Thompson . |
| 5,249,051 | 9/1993 | Elberbaum et al. . |
| 5,262,869 | 11/1993 | Hong ........................................ 348/211 |
| 5,264,929 | 11/1993 | Yamaguchi . |
| 5,267,039 | 11/1993 | Elberbaum . |
| 5,274,450 | 12/1993 | Elberbaum . |

(List continued on next page.)

FOREIGN PATENT DOCUMENTS

| | | |
|---|---|---|
| 2704379-A1 | 4/1993 | France . |
| 357079781 | 5/1982 | Japan . |
| 2109198 | 4/1990 | Japan . |
| 4192780 | 7/1992 | Japan . |
| 4287488 | 10/1992 | Japan . |

OTHER PUBLICATIONS

Elbex, Ltd., Framelock Series, Oct. 1993.
Elbex, Ltd., Catalog, Serial Video Series, Oct. 1995.
Elbex, Ltd., What Is I-D Code?, Nov. 1995.

*Primary Examiner*—Tuan V. Ho
*Attorney, Agent, or Firm*—Jenkens & Gilchrist, P.C.

[57] ABSTRACT

A system for processing video signals to compensate for distance-induced video signal delays includes a camera controller and distant camera are arranged so that the camera controller generates and sends a synchronization signal to the camera, which upon receiving it generates and sends back to the camera controller a reference signal starting at a fixed time following camera receipt of the synchronization signal, and further arranged so that the reference signal upon receipt by the camera controller is compared by the reference pulse comparator to determine if it is late, early, or at an acceptable time, upon which determination a phase adjustment signal is generated and sent by the camera controller to the camera second timing generator phase offset adjustment section to adjust appropriately the timing of the insertion of a video signal onto the transmission line by the camera.

10 Claims, 5 Drawing Sheets

U.S. PATENT DOCUMENTS

| | | |
|---|---|---|
| 5,283,649 | 2/1994 | Elberbaum et al. . |
| 5,293,231 | 3/1994 | Elberbaum et al. . |
| 5,335,014 | 8/1994 | Elberbaum . |
| 5,361,096 | 11/1994 | Ohki et al. . |
| 5,371,535 | 12/1994 | Takizawa . |
| 5,389,968 | 2/1995 | Kayanagi et al. ............... 348/211 |
| 5,438,362 | 8/1995 | Tabuchi . |
| 5,479,206 | 12/1995 | Ueno et al. ............... 348/211 |
| 5,508,737 | 4/1996 | Lang . |
| 5,550,584 | 8/1996 | Yamada . |
| 5,579,060 | 11/1996 | Elberbaum . |
| 5,583,796 | 12/1996 | Reese . |
| 5,621,729 | 4/1997 | Johnson et al. . |
| 5,675,738 | 10/1997 | Suzuki et al. . |
| 5,696,553 | 12/1997 | D'Alfonso et al. ............... 348/211 |

PHASE COMPENSATION FOR VIDEO CAMERAS

BACKGROUND

The present invention relates to systems for processing video signals, and more particularly, to systems that compensate for video signal delays occurring as a result of the transmission.

Synchronization of multiple video cameras from a single location for multiplexing into a single video stream is complicated by the propagation delay experienced by both synchronization signals traveling from the controller to the cameras, and the video signals traveling from the cameras to the controller. This two-way propagation delay varies from camera to camera depending on the distance at which the camera is located from the controller. Also, in a color system where the camera inserts a color burst onto the video signal, the color burst will also be offset from its specified location with respect to the master horizontal synchronization signals of the controller. This offset of the burst signal can cause problems for other equipment downstream trying to decode the color video signal. Therefore, there is a need for systems and methods which can compensate for this offset of video signals due to the transmission of video signals between the camera and the controller.

SUMMARY

In accordance with the invention, a system is provided for processing video signals to compensate for video signal delays arising from the distance between a camera controller which inserts synchronization signals onto a transmission line and a camera which inserts video signals onto the transmission line in response to the synchronization signals. The system includes a camera, a camera controller positioned at a distance from the camera and a camera link line adapted to transmit signals in both directions over that distance.

The camera controller includes a timing generator and microcontroller therefor, a synchronization signal inserter, a reference pulse comparator, and a communication data inserter. The camera includes a second timing generator including a phase offset adjustment section responsive to phase adjustment signals from the camera controller, a reference pulse generator, and a communications data separator.

The camera controller and camera are arranged so that the camera controller generates and sends a synchronization signal to the camera, which upon receiving it generates and sends back to said camera controller a reference signal starting at a fixed time following camera receipt of said synchronization signal. The reference signal, upon receipt by the camera controller, is compared by the reference pulse comparator to determine if it is late, early, or at an acceptable time, upon which determination a phase adjustment signal is generated and sent by the camera controller to the camera second timing generator phase offset adjustment section to adjust appropriately the timing of the insertion of a video signal onto the transmission line by the camera.

BRIEF DESCRIPTION OF THE DRAWINGS

These and other features, aspects, and advantages of the present invention will become better understood with regard to the following detailed description, appended claims, and appended drawings, where:

DETAILED DESCRIPTION

Figure 1:
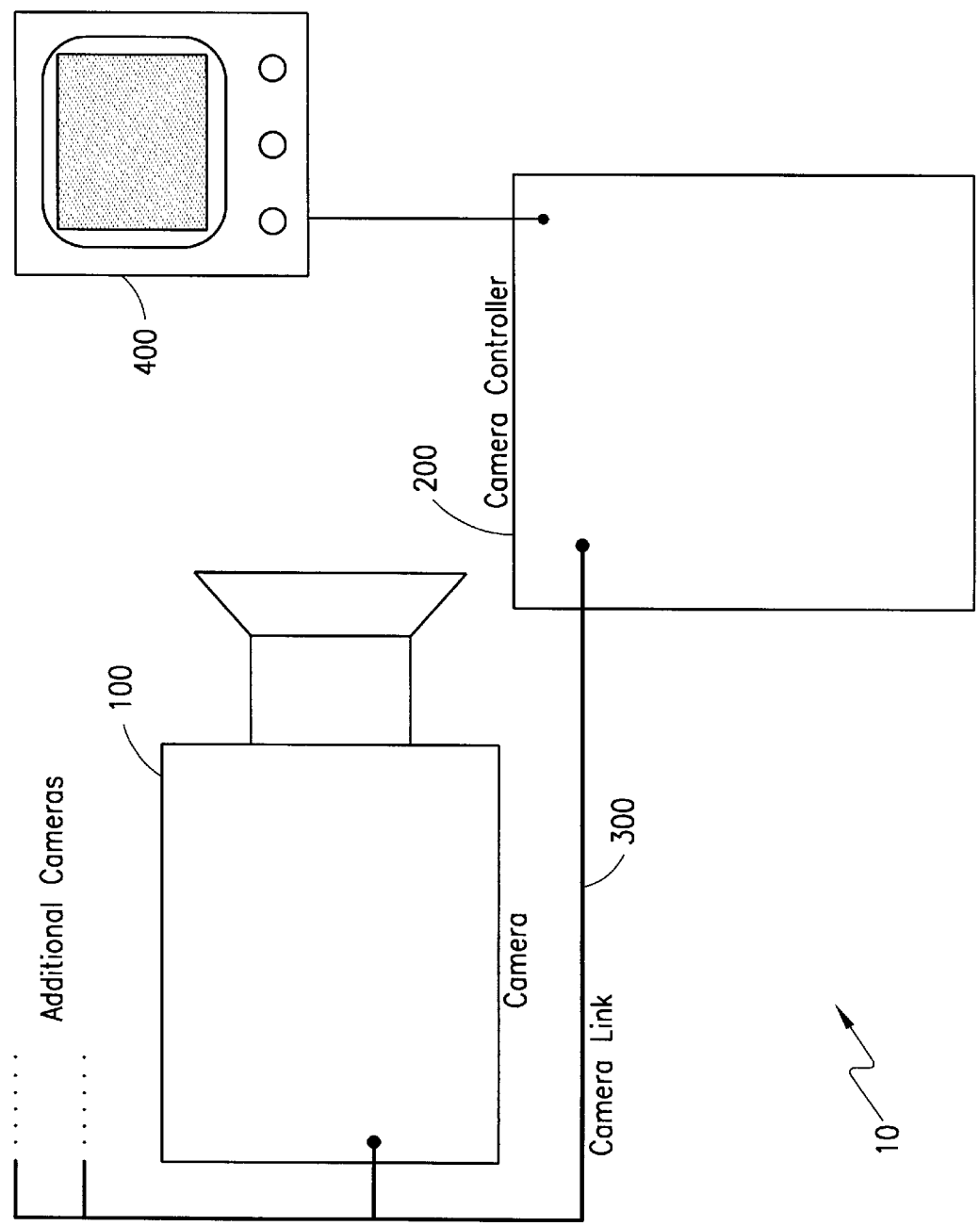
FIG. 1 is a block diagram of a video system incorporating one embodiment of the present invention.

Referring now to the figures, and more particularly to FIG. 1, there is shown a video system 10 illustrating one embodiment of the present invention. The video system 10 generally comprises a camera 100 sending video signals to a camera controller 200 over a camera link 300, and a monitor 400 receiving video signals from the camera controller 200. The camera 100 is capable of bi-directional communications with the controller 200 and is also capable of adding a phase offset between incoming horizontal synchronization signals and the video output of the camera. The camera 100 also generates a reference pulse that is inserted into the video stream on the camera line 300 for use by the camera controller 200 in determining the length of cable 300 connecting the camera 100 to the controller 200. The controller 200 also is capable of bi-directional communications with the camera 100. Although the video system 10 illustrated uses a monitor 400, any device for receiving video from the camera controller can be used to receive the phase compensated video (e.g. monitor, video recording unit, etc.). In one embodiment, the camera controller 200 generates the standard video composite sync signal and inserts the composite video synchronization onto the camera link 300 in a current mode, for use as a master synchronization signal by the camera 100.

Figure 2:
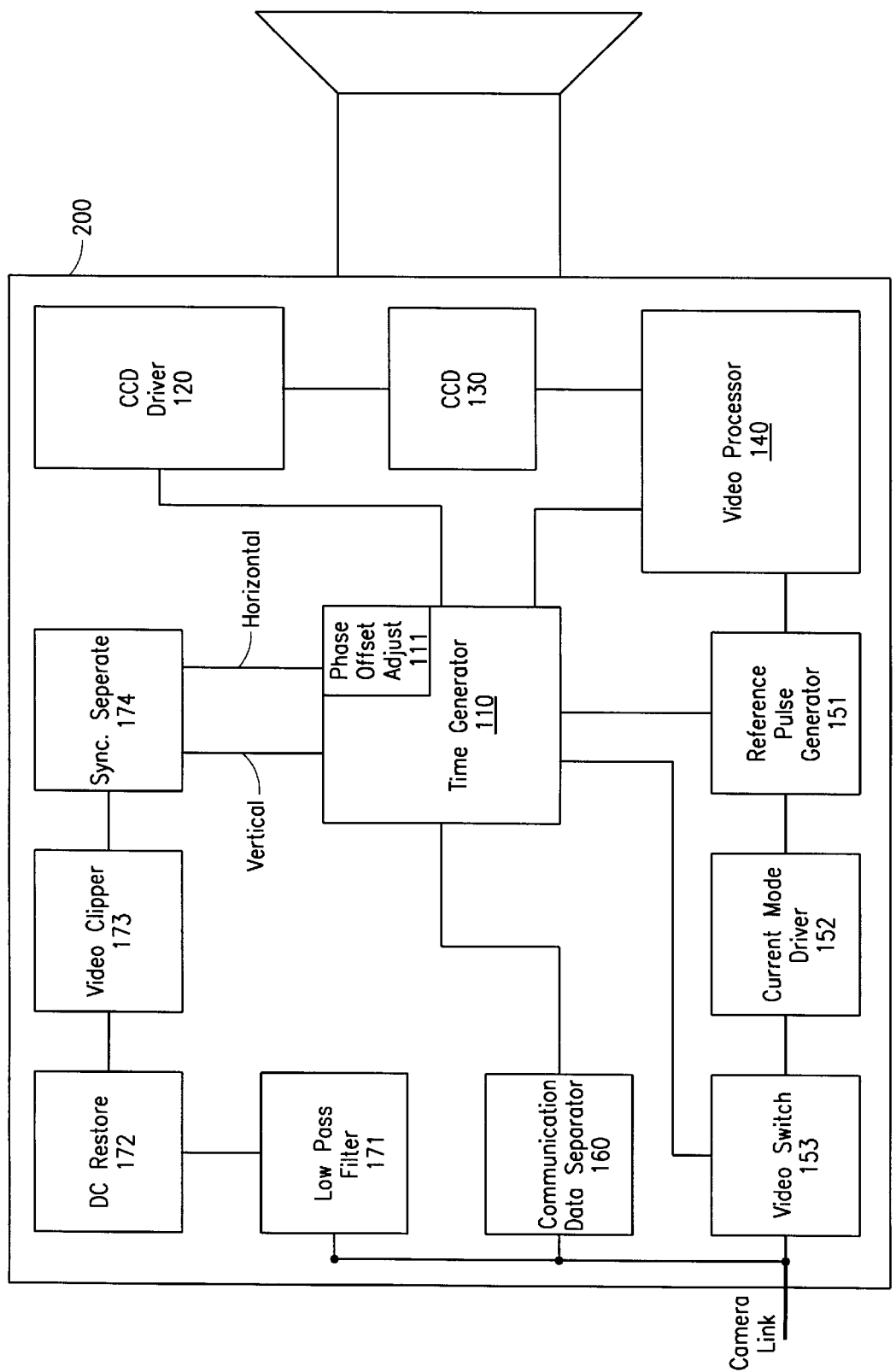
FIG. 2 is a block diagram illustrating the components of the camera from the video system in FIG. 1.

Referring now to FIG. 2, there is shown a block diagram of the camera 100 in FIG. 1. The camera 100 generally comprises a timing generator 110, a CCD (charge coupled device) driver 120, a CCD (charge coupled device) 130, a video processor 140, a reference pulse generator 151, a current mode driver 152, a video switch 153, a communications data separator 160, a low pass filter 171, a DC restorer 172, a video clipper 173, a sync separator 174, and a phase offset adjust 111.

Still referring to FIG. 2, the timing generator 110 generates signals for operating the CCD 130. The signals from the timing generator 110 to operate the CCD 130 pass through the CCD driver 120 that converts the signals to a level necessary to operate the CCD 130. The CCD 130 generates an analog video signal that is received by the video processor 140. The video processor 140 receives the synchronization signals from the timing generator 110 and conditions the video signals from the CCD 130 into standard composite levels. The reference pulse generator 151 receives the pulse and synchronization data from the timing generator 110, and adds the reference pulse and data to the video image from the video processor 140. The current mode driver 153 converts the voltage level mode video from the reference pulse generator 151 and the video processor 140 into a current mode. The video switch 153 controls the insertion of video onto the camera link 300 based on a control signal from the timing generator 110.

Referring still to FIG. 2, the communications data separator 160 strips off data from the incoming video on the camera link 300 and sends that information to the timing generator 110. Data sent to the timing generator 110 by the communications data separator 160 includes the commands for when the camera 100 is to insert video on the camera link 300, and a phase up/phase down/phase neutral signal generated by the controller 200. The timing generator uses the command codes for when the camera is to insert video onto the camera link 300 to determine when to activate the video switch 153 thereby inserting video on the camera link 300.

Still referring to FIG. 2, the low pass filter 171, dc restorer 172 and video clipper 173, pre-condition the video signals from the camera link 300 for receipt by the synchronization separator 174. The synchronization separator 174 extracts the vertical and horizontal synchronization signals and sends those two signals to the timing generator 110. A phase offset adjust 111 in the timing generator 110 receives the horizontal synchronization signal from the synchronization separator 174. The phase offset adjust 111 will adjust the horizontal synchronization signal forward a predetermined time period, backward a predetermined time period, or not at all depending on the status of the phase up/phase down/phase neutral signal received by the timing generator 110 from the communications data separator 160.

Figure 3:
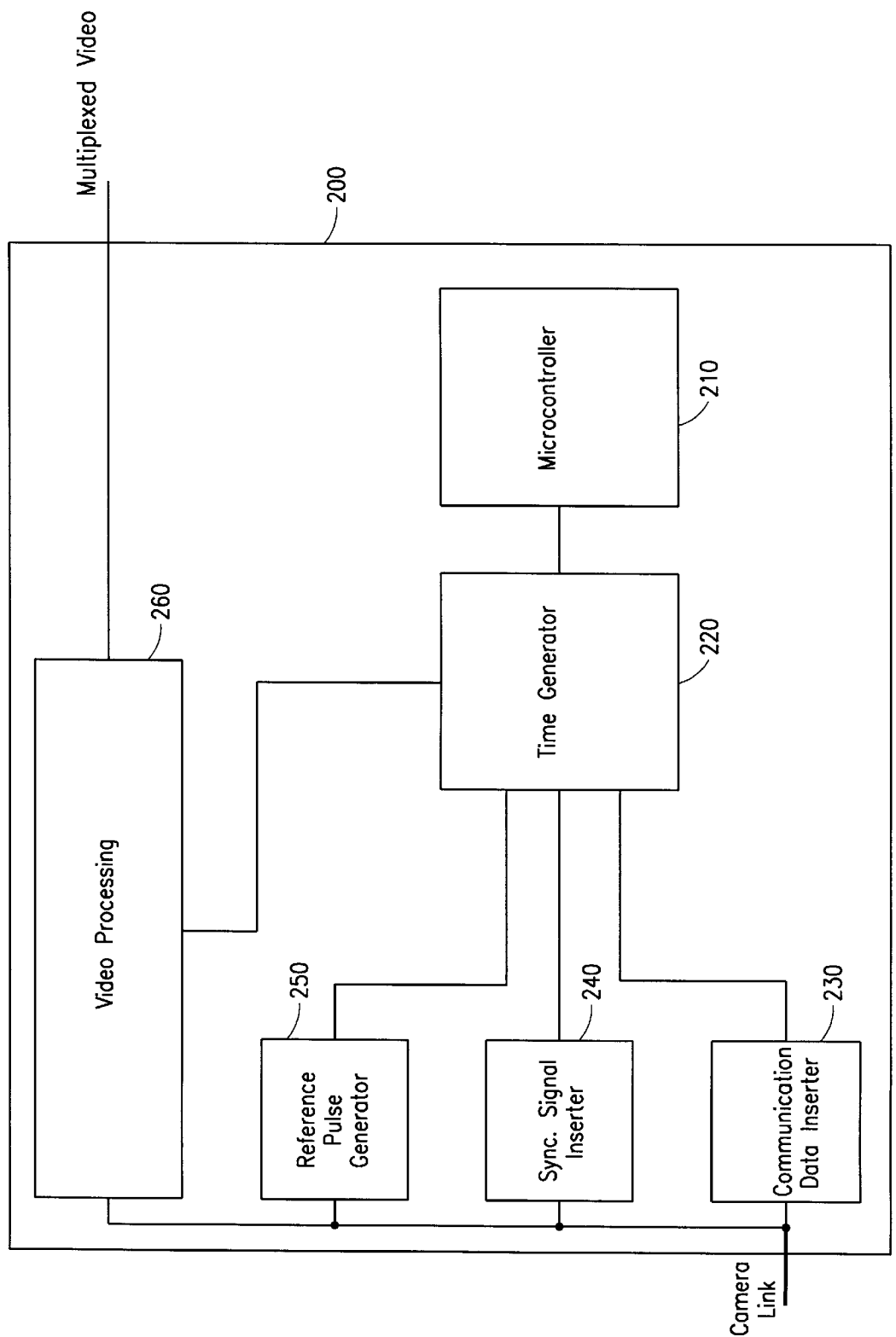
FIG. 3 is a block diagram illustrating components of the camera controller from the video system in FIG. 1.

Referring now to FIG. 3, there is shown a block diagram of the camera controller 200 in FIG. 1. The camera controller 200 generally comprises a microcontroller 210, a timing generator 220, a communications data inserter 230, a synchronization inserter 240, a reference pulse comparator 250, and a video processor 260.

Still referring to FIG. 3, the microcontroller 210 of the camera controller 200 contains the instructions for control of the camera controller 200. The reference pulse comparator 250 receives the reference pulse inserted by the camera 100 and transmits the location of that reference pulse to the timing generator 220. The timing generator 220 takes the reference pulse from the reference pulse comparator 250 and informs the microcontroller 210 if the reference pulse is late, early, or within a dead band window. The microcontroller 210 sends back a correction code to the timing generator 220 for the timing generator 220 to send a phase up/phase down/phase neutral signal to the camera 100. The timing generator 220 instructs the communication data inserter 230 to insert a serial communication during the vertical interval of the video signal for the camera 100 to make a fixed increment change of phase up, phase down, or no change (phase neutral). The transmission of data from the controller 200 to the camera 100 is accomplished by summing 85 IRE pulses onto the coaxial cable 300 during a vertically blanked video line. The process of receiving a reference signal from the camera and sending a phase up/phase down/phase neutral signal to the camera 100 occurs each field. Eventually, the phase up/phase down/phase neutral signal will tend to stabilize in the phase neutral position.

Referring still to FIG. 3, the microcontroller 210 and the timing generator 220 use the synchronization signal inserter 240 to insert a synchronization signal that the camera uses to synchronize the camera generated by the camera 100. In one embodiment, the synchronization of the camera 100 and video insertion of the camera 100 is controlled in the same manner as the teaching in U.S. patent application Ser. No. 08/501,261, entitled "VIDEO MULTIPLEXER", filed on Jul. 11, 1995, assigned to the assignee of the present invention, which is hereby incorporated in its entirety herein by reference hereto. The video processor 260 provides the standard processing of video signals received from the camera 100 prior to output as the multiplex video.

Figure 4:
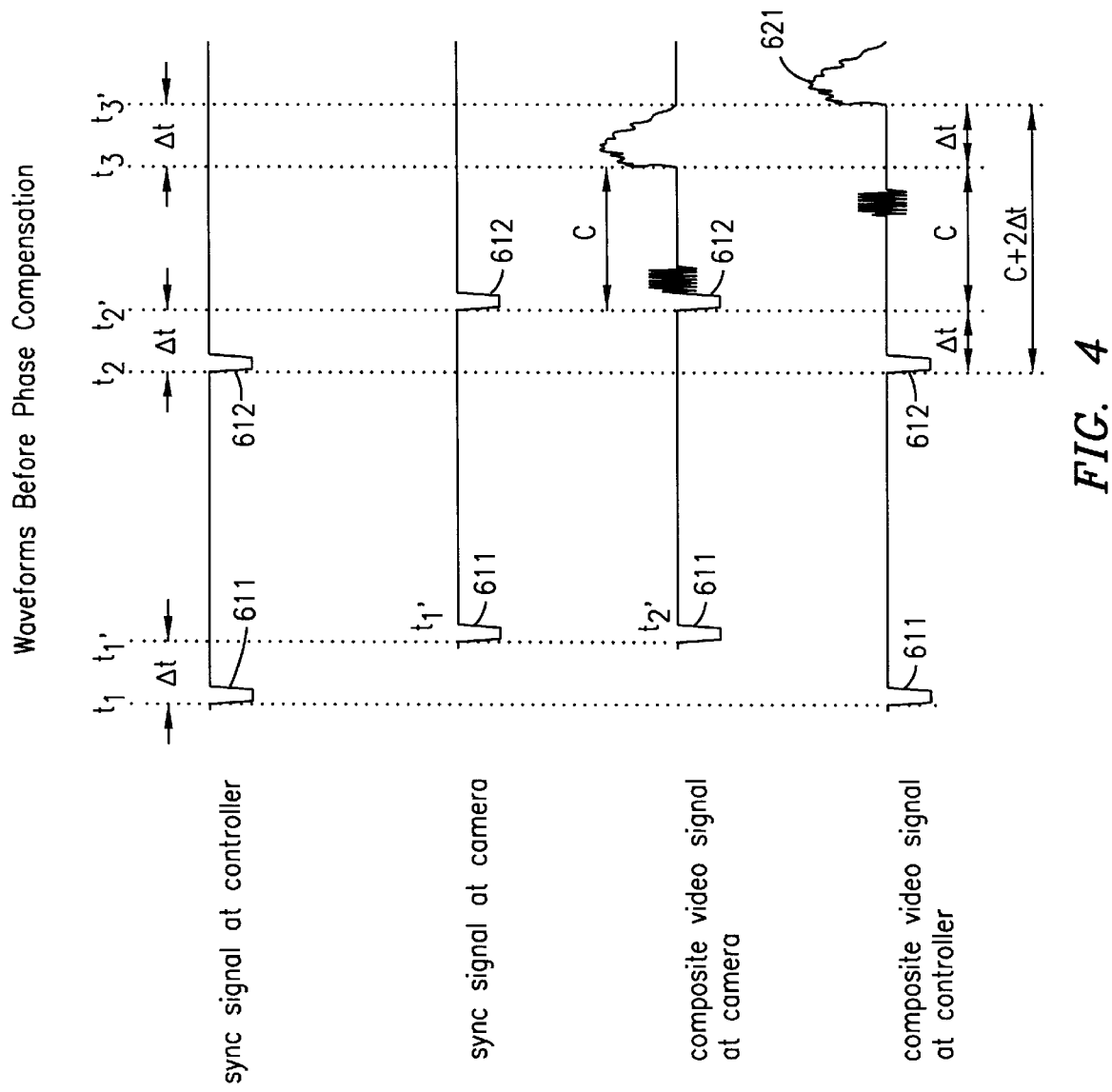
FIG. 4 is a diagram illustrating the video wave forms at the controller and at the camera before phase compensation.

Referring now to FIG. 4, there is illustrated the wave forms of the video at the camera and the camera controller prior to phase compensation by the present invention. The camera controller inserts composite video synchronization signals 611 and 612 in the composite video synchronization time periods $t_1$ and $t_2$, respectively. At the camera, the synchronization signals 611 and 612 are located at times $t_1'$ and $t_2'$, respectively. The times $t_1'$ and $t_2'$ are phase offset from the times $t_1$ and $t_2$ by a time period of $\Delta t$ because of the phase offset caused in the transmission. Upon receiving the synchronization signal 612, the camera inserts the video image signal 621 in the appropriate composite video position which is located at time period C from the horizontal synchronization pulse 612. Because the camera receives the synchronization signal 612 at time $t_2'$, the camera inserts the video image signal 621 at time $t_3$, which is located a time period of C from the time $t_2'$.

Still referring to FIG. 4, a phase shift occurs on the composite video image signal 621 between the camera and the camera controller due to the length of transmission that the composite video image signal 621 must travel. The composite video image signal 621 occurs at the camera controller at a time $t_3'$ which is typically the same time difference $\Delta t$ as between the time periods $t_1$ and $t_1'$, and the time periods $t_2$ and $t_2'$. Although the camera controller reads the composite video image signal 621 at the delayed time $t_3'$ because of the distance between the camera and the controller, the camera controller reads the synchronization pulses 611 and 612 at the time positions $t_1$ and $t_2$ at which the camera controller inserted those synchronization pulses 611 and 612 because no distance is involved in their insertion by it. As a result, the composite video image signal 621 occurs at a time period of $2\Delta t$ past the conventional location of a time period of C after the composite video synchronization pulse.

Figure 5:
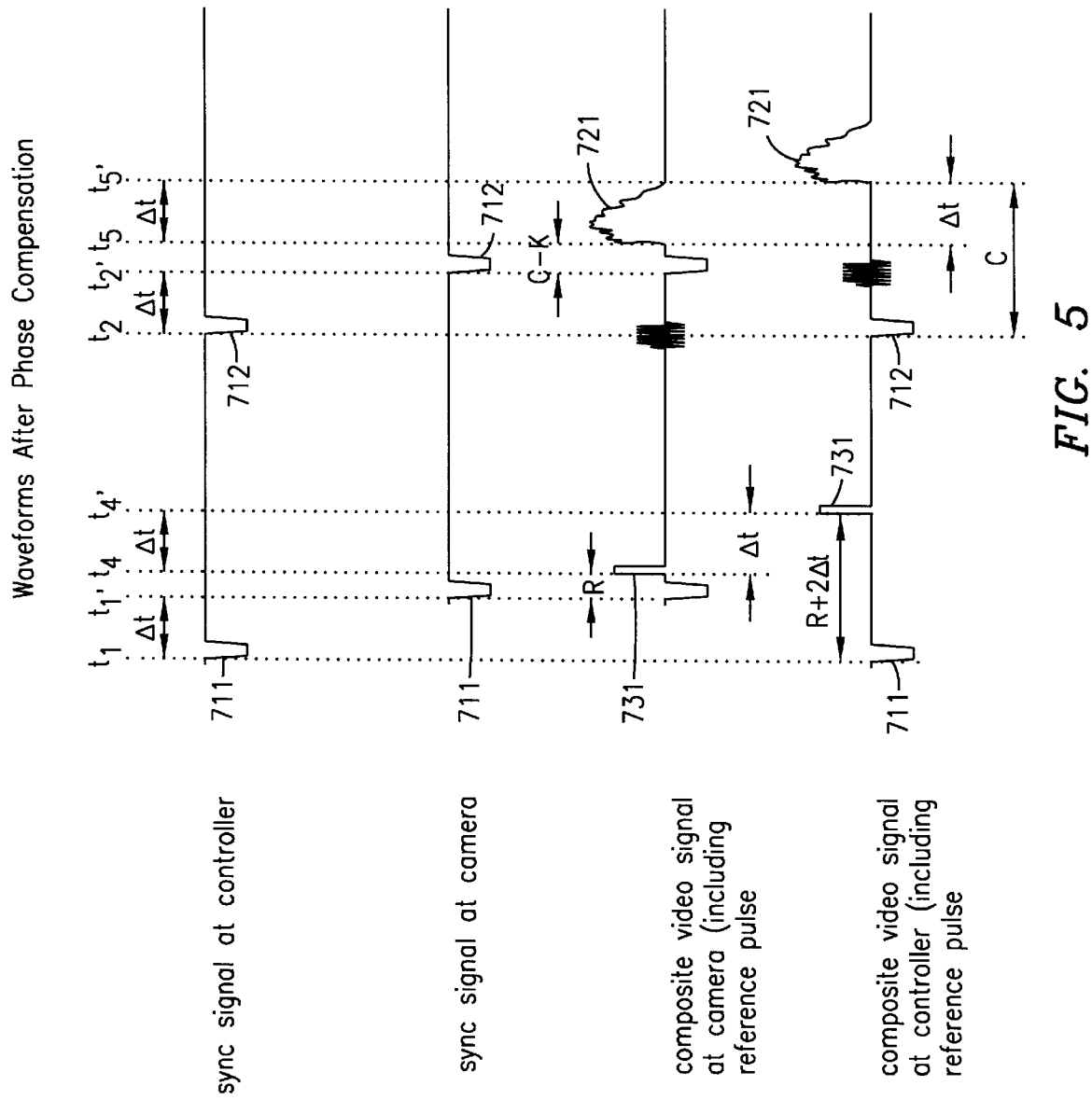
FIG. 5 is a diagram illustrating the video wave forms at the controller and at the camera after phase compensation.

Referring now to FIG. 5, in accordance with the invention, in order to compensate for the phase shift attributable to transmission lengths, the camera of the present invention inserts a reference signal 731 at a predetermined timed delay R after receiving the synchronization signal 711. The camera receives the synchronization signal 711 at time $t_1'$, which is located a time period $\Delta t$ from the time $t_1$ at which the camera controller inserts the synchronization pulse 711. The camera inserts the reference signal 731 at a time $t_4$, which is the time $t_1'$ plus the time period R, and which is also the time $t_1$ plus the delay time period $\Delta t$ plus the time period R. Due to the transmission of the reference signal from the camera to the camera controller, the reference signal 731 occurs at the controller at a time $t_4'$, which is at a location of a time period $\Delta t$ after the time $t_4$, which is also located at a time period of R plus a time period of $2\Delta t$ past time $t_1$.

The reference pulse comparator 250 receives the reference pulse inserted by the camera 100 and transmits the location of that reference pulse to the timing generator 220. The timing generator 220 takes the reference pulse from the reference pulse comparator 250 and informs the microcontroller 210 if the reference pulse is late, early, or within a dead band window. The microcontroller 210 sends back a correction code to the timing generator 220 for the timing generator 220 to send a phase up/phase down/phase neutral signal to the camera 100. The timing generator 220 instructs the communication data inserter 230 to insert a serial communication during the vertical interval of the video signal for the camera 100 to make a fixed increment change of phase up, phase down, or no change (phase neutral).

Still referring to FIG. 5, the camera uses the phase up/phase down/phase neutral signal on the transmission link to command the camera to make a predetermined increment phase offset between the synchronization signal 712 and the video image signal 721 inserted on the camera link by the camera. The camera receives the synchronization signal 712 at a time $t_2'$ that is located a time period $\Delta t$ after the time $t_2$ that the camera controller inserts the synchronization signal 712 on the camera link. The camera inserts the composite video image signal 721 on the camera link at a time $t_5$ that is located at a position after receiving the synchronization signal 712 of a time period C less a time period K. The time period K represents a predetermined increment of time that the composite video signal 721 is to be inserted after receiving the synchronization signal 712. If the phase up/phase down/phase neutral signal is in the phase neutral position, the time period K equals $2\Delta t$. If the phase up/phase down/phase neutral signal is in the phase up position, the time period K equals a preset amount less than $2\Delta t$. If the phase up/phase down/phase neutral signal is in the phase down position, the time period K equals a preset amount greater than $2\Delta t$.

It should be noted that for a long cable run, with a large offset subtracted from the camera's horizontal synchronization pulses, the camera should actually sum video information on top of the synchronization signal. Although the video signal at the controller end of the cable will still be phased properly, the syncs at the camera end of the cable must not be allowed to be corrupted or else the camera's synchronization separator will not function properly and the camera will lose synchronization with the master. Thus the amount of phase compensation (and maximum cable length) must be limited to such that the active portion of the video line is not allowed to overlay the sync portion of the video line. For a coaxial cable, this maximum length is about 2,000 feet. It is, however, acceptable for the color burst signal (generated by the camera) to overlay the sync portion of the video line because the color burst signal frequency is removed with a filter by the sync separator before processing.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A system for processing video signals to compensate for video signal delays arising from the distance between a camera controller which inserts synchronization signals onto a transmission line and a camera which inserts video signals onto said transmission line in response to said synchronization signals comprising:

a camera link line;

a camera controller comprising a timing generator for generating a synchronization signal, a synchronization signal inserter for inserting the synchronization signal from the timing generator onto said camera link line, a reference pulse comparator, and a communication data inserter;

a camera comprising a secondary timing generator for receiving the synchronization signal from said camera link line and generating a secondary timing signal in response thereto, a video generator for receiving the secondary timing signal and generating a video signal in response thereto, a reference pulse generator for receiving the synchronization signal from said camera link line and inserting a reference pulse onto said camera link line in response thereto, and a communications data separator;

wherein said reference pulse comparator receives the reference pulse from said camera link line and determines if the reference pulse is late, early, or at an acceptable time, and wherein said communication data inserter inserts a phase adjustment signal onto said camera link line correlating to the determination by the reference pulse comparator for adjustment of the timing of the video signal generated by said camera; and wherein said secondary timing generator further includes a phase offset adjustment section for adjusting the timing of the timing signal, and wherein the communications data separator receives the phase adjustment signal from said camera link line and instructs the phase offset section of the secondary timing generator of the camera to correspondingly adjust the secondary timing signal for adjusting the timing of the video signal generated by said camera.

2. The system according to claim 1, wherein said video generator includes a charge coupled device.

3. The system according to claim 2, wherein said video generator further includes and charge coupled device that converts the secondary timing signals from the secondary timing generator into a level necessary to operate the charge coupled device.

4. The system according to claim 1, wherein said camera controller further includes a video processing unit for receding the video signals from said camera and conditions the video signals to standard composite levels.

5. The system according to claim 1, wherein said camera further includes a current mode driver connected to convert the reference pulse and the video signal from sand camera into a current mode.

6. The system according to claim 1, wherein said camera further includes a video switch connected to control the insertion of the video signal from the video generator onto said camera link line based upon a control signal from the timing generator in said camera controller.

7. The system according to claim 1, wherein the phase adjustment signal inserted by the timing generator is a phase up signal, phase down signal, or phase neutral signal that corresponds to the late, early, or acceptable timing determination by the reference pulse comparator, respectively, of said camera controller.

8. The system according to claim 7, wherein communications data separator instructs the secondary timing generator to make a fixed incremental timing change of phase up, phase down, or no change for the phase adjustment signals of phase up signal, phase down signal, or no change, respectively.

9. The system according to claim 1, wherein said camera further includes a synchronization separator for extracting the synchronization signal from said camera link line and providing the synchronization signal to the timing generator of said camera.

10. The system according to claim 1, wherein the synchronization signal inserted onto said camera link line by the camera controller is the standard video composite sync signal.

* * * * *